D. STERN.
ASH SIFTER.
APPLICATION FILED NOV. 30, 1912.
1,188,856.
Patented June 27, 1916.
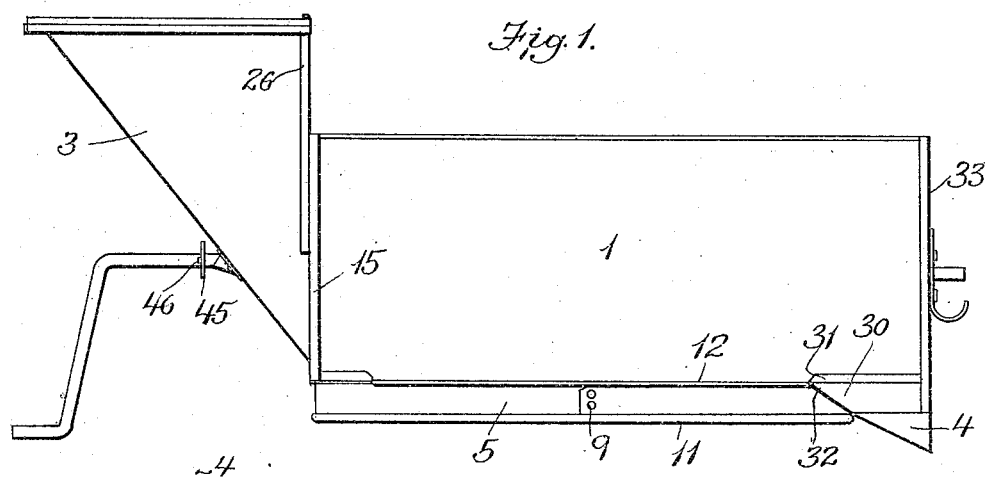
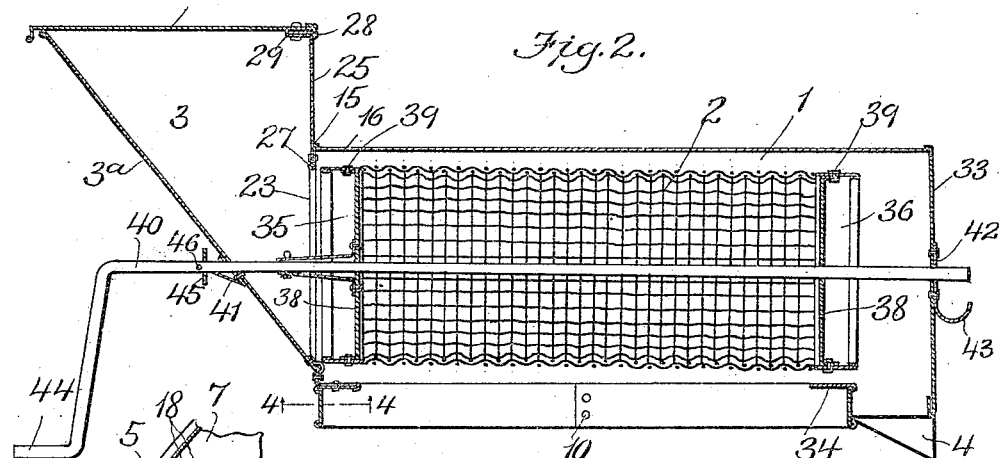
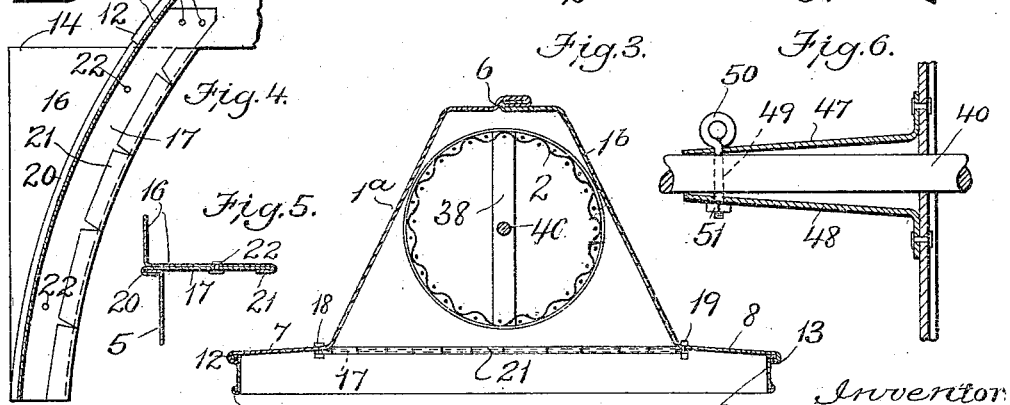
Witnesses:
H. A. Rahn
G. L. Johnson
Inventor
David Stern
by Wright Brown Quimby & May
Attys.

UNITED STATES PATENT OFFICE.

DAVID STERN, OF DORCHESTER, MASSACHUSETTS.

ASH-SIFTER.

1,188,856.  Specification of Letters Patent.  Patented June 27, 1916.

Application filed November 30, 1912. Serial No. 734,290.

*To all whom it may concern:*

Be it known that I, DAVID STERN, a citizen of the United States, and resident of Dorchester, in the county of Suffolk and State of Massachusetts, have invented certain new and useful Improvements in Ash-Sifters, of which the following is a specification.

This invention relates to ash sifters of the type including a rotary sieve and a casing for such sieve combined with a cover adapted to extend over a barrel or other ash receptacle, and with a hopper for conducting the material to be sifted into the sieve.

The objects of the invention are concerned both with the structure of the casing and with certain improvements in the sieve, to the end that the casing may be stronger and more rigid than those of similar nature heretofore produced, besides being more economical to manufacture, and that the sieve may be easily assembled upon its actuating shaft within the casing and may be easily removed and replaced if necessary. The manner in which I accomplish these objects is described in the following specification in connection with a detailed description of the embodiment of my invention illustrated in the accompanying drawings.

In the drawings, Figure 1 is a side elevation of the complete sifter. Fig. 2 is a longitudinal section of the sifter. Fig. 3 is a cross section of the sifter looking toward the front end. Fig. 4 is a detail view on an enlarged scale of the feature of construction of the sifter, the view being in section and under plan, viewed in the direction of the arrows in line 4—4 of Fig. 2. Fig. 5 is a detail of construction in vertical section, of the same part of the sifter. Fig. 6 is a view in longitudinal section of a detail of construction of the sieve and its operating shaft.

The same reference characters indicate the same parts in all the figures.

The sifter as a whole comprises a casing 1 in which is contained a sieve 2, and with which there is combined a hopper 3, an outlet 4 and a receptacle cover 5. The casing 1 is preferably in the form of a truncated triangular prism, having sloping sides 1ª and 1ᵇ which diverge downwardly from the casing top. The casing sides and top may be made either of one or two pieces of sheet metal bent into the form shown in Fig. 3. Where two pieces are employed, as here shown, they are preferably united by a seam 6 at the top extending longitudinally from end to end. An important feature of the present invention is that the top of the receptacle cover is made integral with the sides of the casing, as shown in Fig. 3, said sides being bent outward on the lines where they meet the plane of the receptacle cover so as to form substantially horizontal flat elements 7 and 8 which are integral with the casing sides 1ª and 1ᵇ, respectively. This feature of the invention is expressed by saying that the top of the receptacle cover is integral with the sides of the casing, and this is true whether the sides are made integral with one another from one piece, or whether they are made of two pieces as shown. As regards this feature of the invention it is immaterial whether the sides and top of the casing are of one piece or not. It is perfectly feasible to make them of one piece as well as to make them of two pieces. Where the sifter is made to fit an ash barrel, as is the usual practice, and is the fact in regard to the present invention, the cover portion is circular, and the outlines of the elements or extensions 7 and 8 are shaped accordingly, as indicated in Fig. 4, where a portion of one end of the extension or flap 7 is shown. These members 7 and 8 may therefore be considered as segments of a circle adapted to overlie the ash receptacle.

The receptacle cover is provided with a rim or flange made preferably of a strip of sheet metal to which the reference numeral 5 is applied, and which is bent into the form of a hoop or cylinder of short axis, the ends of which are overlapped and riveted as shown at 9. In the particular sifter here illustrated the cover rim is made of two semi-circular strips which are lapped and riveted not only at the point 9 but also at an opposite point 10 as appears in Fig. 2. The lower edge of this flange or rim is rolled up to form a strengthening bead 11, and its upper edge is united to the outer edges of the top extensions 7 and 8 by seams 12 and 13, the rim or band having its edge turned outwardly and the edges of the top plates being wrapped about such outwardly turned edge.

The corners of the casing 1 extend beyond the periphery of the receptacle cover, at the front end of the sifter, that is, the end to which the hopper is connected. One of such projecting corners is indicated at 14 in Fig. 4. The wall at this end and the bottoms of the projecting corners are all made of one piece of sheet metal, having the shape of the cross section of the casing, with an extension at its bottom. The top and side edges are united to the edges of the top and sides of the casing by a seam 15. Its bottom extension is turned up under the bottom of the end of the casing and is cut away on a line which, in this instance, is the arc of a circle concentric with the receptacle cover but of smaller radius. The important feature of this part of the invention is that the end wall and the bottom 16 of the casing end are integral, being made of the same piece of sheet metal. Such bottom member or element 16 extends across the upper edge of the receptacle cover flange 5 and across a tie strip 17 shown in Fig. 4, which crosses the space between the elements 7 and 8 of the receptacle top and is fastened thereto by rivets 18 and 19, respectively. Such tie strip extends over the edge of the cover flange 5 and is lapped over the outwardly turned edge thereof to make a seam 20 between the terminations of the seams 12 and 13. The innermost edge of the front wall and bottom member 16 of the casing is carried beyond the inner edge of the tie strip 17 and bent about the same, being preferably cut into tongues 21 for convenience in carrying out this operation. There is no reason except mechanical convenience, however, for forming such tongues, and the latter may therefore be considered as parts of a continuous flange on the member 16, which embraces the inner edge of the tie member. In addition rivets 22 will be applied if desired to unite the member 16 to the tie strip 17 at other points.

In the end wall 16 there is a circular hole 23 in axial alinement with the rotary sieve and of approximately the same diameter as the sieve. The hopper 3 is fastened to said front wall and has an outlet opening into this hole. Said hopper is composed of two pieces of sheet metal and a cover 24. One of the pieces which forms the hopper is so bent as to form a downwardly sloping front wall 3ª and downwardly and inwardly sloping side walls. Said front and side walls terminate in an edge coinciding with the lower half of the opening 23. The rear wall of the hopper is a separate plate or sheet 25 connected at its edges with the abutting edges of the hopper sides by a seam 26 and overlapping the end wall of the casing. The bottom of the hopper wall 25 is cut away to register with the opening 23 in the end wall 16, and the edges of the opening 23 in the wall 16 are preferably bent outward to lap over the edge of the hopper plate 25 for the purpose of closing any opening which might develop through which the light ash dust could escape. The casing end and hopper rear walls are united by rivets 27. The upper edges of the hopper are stiffened by a wire 28 around which the edges of the hopper walls are curled, and said wire at the rear of the hopper serves as a hinge pintle around which hinge leaves 29, riveted to the cover are passed. Thus the cover is hinged to the hopper. The edges of the cover are bent down and curved back to give stiffness.

The rear end of the casing extends beyond the receptacle cover and is closed at the bottom by a plate 30, the central part of which is offset downwardly to provide a spout 4. The junctions between this plate and the casing sides are made secure by seams 31, while the edge of the plate 30 which abuts against the rim of the receptacle cover is soldered thereto on the line 32. At the rear end of the casing I provide an end wall 33 extending across all of the space bounded by the casing sides and top and by the bottom plate 30, except the space bounded by the edges of the spout 4, which is left open. Said end wall is seamed to the casing sides, top, and bottom.

An additional tie strip 34 similar to the tie strip 17 is provided for tying the sides of the casing together within the receptacle cover at the opposite end of the ash discharge opening from that at which the strip 17 is located.

From the foregoing description it will be seen that I have provided a structure for a sieve casing and receptacle cover which is simple, strong and rigid, which has an inlet for the ashes to be sifted, a large central outlet bounded by the bottom edges of the casing sides and by the strips 17 and 34, through which the ash may fall freely into the receptacle, and has further a discharge mouth 4 through which the cinders may pass. As the sides of the casing flare downwardly and outwardly they give to that structure the greatest possible strength, making it impossible for the casing to be displaced sidewise, and at the same time eliminating anything in the nature of a ledge or obstruction at the sides of the casing whereon the ash may lodge.

The sieve consists of a sheet of screen fabric bent into cylindrical form and supported and held in such form by hoops 35 and 36 at the ends. Such hoops are conveniently made of sheet metal stiffened by turned over flanges at their outer edges and having their overlapping or abutting edges secured together by solder or equivalent fastening. The screen fabric is connected to the hoops in any convenient manner, as by solder at a sufficient number of points.

Within each hoop is a diametrically arranged bar 38 having its ends bent over within the hoop and secured thereto by rivets or bolts 39 as indicated in Fig. 2. These bars have holes in the axis of the sieve, through which passes an operating shaft 40, said shaft passing also through the front wall of the hopper and the rear wall 33 of the casing and having a bearing in each of said walls. The bearing in the hopper is reinforced by a strap 41 riveted to the hopper wall and having an offset between its points of attachment to such wall. The bearing in the wall 33 is likewise reinforced by a strap 42 riveted to the wall and having its lower end extended to form a hook 43 for supporting the pail into which the cinders discharge from the spout 4. The front end of the shaft is bent out of line to form a crank 44. The shaft is free to move endwise in the casing except as its rearward movement is limited by a washer 45 secured upon a pin 46 near the bearing 41, and as its forward movement is limited by the end of the sieve making contact with the end wall of the casing. The shaft, however, can be detached from the sieve and withdrawn in a forward direction, permitting the sieve to be removed. The mode of its attachment to the sieve is an important feature of the invention and is made as follows: To the front cross bar 38 of the sieve there are connected two arms 47 and 48 united preferably as shown in Fig. 6 on opposite sides of the hole through which the shaft passes. These arms are bent outwardly so as to extend alongside the shaft and are separated sufficiently to permit easy insertion of the shaft between them. Through these arms and the shaft extends a bolt 49 having a head 50 of such size and shape that it may be easily grasped and firmly held between the thumb and forefinger of a person's hand. On the other end of the bolt there is screwed a nut 51. These arms extend into the hopper 3 as shown in Fig. 2 so that the user may place both hands in the hopper and grasp the nut and bolt for the purpose either of removing or attaching them. When the nut and bolt are removed the shaft can be pulled out endwise and the sieve is then free to be taken out through the bottom of the casing. An equally easy assembling of the sieve within the casing is permitted by first placing the sieve in the casing and then passing the shaft through it and through the end wall 33 until the bolt holes in the shaft and the arms 47 and 48 register. Then the bolt may be passed through these holes and the nut applied.

I claim:

1. An ash sifter comprising a casing, a hopper annexed to one end of the casing and opening thereinto, a cylindrical sieve contained in the casing having open ends, one of which is closely adjacent to the hopper outlet, bars mounted in the sieve at axially separated points crossing the same diametrically and having holes in the sieve axis, a shaft passing freely through such holes and through the front wall of the hopper and having a crank outside of the hopper, arms secured to the bar nearest the hopper extending on both sides of the shaft into the hopper, and a bolt passing through said arms and the shaft in accessible position within the hopper.

2. In an ash sifter, a cylindrical sieve having open ends, bars crossing the sieve near the ends thereof and having centrally located holes, a shaft passing freely through such holes, an arm secured to one of said bars extending beyond the end of the sieve beside the shaft, and a fastener passing through the arm and shaft.

3. In an ash sifter the combination of a prismatic casing including in its construction a hopper arranged to discharge into one end, and a wall at the other end, a shaft passing longitudinally through said casing having a bearing in a wall of said hopper and in the opposite end wall of the casing, said shaft being capable of withdrawing endwise from the casing, an open cylindrical sieve including in its construction end frames and a screen, said end frames having central openings through which the shaft passes, an arm secured to the front end frame of the sieve and projecting beside the shaft into the hopper, whereby it is rendered accessible, and a removable detaching device passed through the accessible parts of said arm and shaft.

In testimony whereof I have affixed my signature, in presence of two witnesses.

DAVID STERN.

Witnesses:
ARTHUR H. BROWN,
PETER W. PEZZETTI.

Copies of this patent may be obtained for five cents each, by addressing the "Commissioner of Patents, Washington, D. C."